US00RE39288E

(19) United States
(12) Reissued Patent
Assaf

(10) Patent Number: US RE39,288 E
(45) Date of Reissued Patent: Sep. 19, 2006

(54) HEAT PUMP SYSTEM AND METHOD FOR AIR-CONDITIONING

(76) Inventor: Gad Assaf, 5 Kosover Street, Rehovot 76408 (IL)

(21) Appl. No.: 10/059,826
(22) PCT Filed: Apr. 9, 1996
(86) PCT No.: PCT/US96/04935

§ 371 (c)(1),
(2), (4) Date: Mar. 17, 1998

(87) PCT Pub. No.: WO96/33378

PCT Pub. Date: Oct. 24, 1996

Related U.S. Patent Documents

Reissue of:
(64) Patent No.: 6,018,954
Issued: Feb. 1, 2000
Appl. No.: 08/973,090
Filed: Mar. 17, 1998

(30) Foreign Application Priority Data

Apr. 20, 1995 (IL) ..... 113446

(51) Int. Cl.
*F25D 17/06* (2006.01)

(52) U.S. Cl. ..... 62/94; 62/332; 62/271; 62/305; 62/310

(58) Field of Classification Search ..... 62/94, 62/332, 271, 305, 310, 93, 335
See application file for complete search history.

(56) References Cited

U.S. PATENT DOCUMENTS

| | | | | | |
|---|---|---|---|---|---|
| 2,556,250 | A | * | 6/1951 | Bauman | 159/3 |
| 2,672,024 | A | * | 3/1954 | McGrath | 62/94 |
| 2,798,570 | A | * | 7/1957 | Kelley | 62/94 |
| 2,894,376 | A | * | 7/1959 | Kelley | 62/271 |
| 2,952,993 | A | * | 9/1960 | Bosworth, Jr. | 62/94 |
| 4,700,550 | A | * | 10/1987 | Rhodes | 62/271 |
| 4,941,324 | A | * | 7/1990 | Peterson et al. | 62/94 |

FOREIGN PATENT DOCUMENTS

WO WO 99/26026 5/1999

* cited by examiner

*Primary Examiner*—William C. Doerrler

(57) ABSTRACT

There is provided a heat pump system including two (4,6), at least similar units in fluid communication with each other, each unit having a housing (8,8'), a first air/brine heat exchanger (12,12'), a second brine/refrigerant heat exchanger (24,24'), a brine inlet (10,10') for applying brine onto at least one of the heat exchangers, a brine reservoir (14,14') and a pump (28) for circulating the brine from the reservoir to the inlet. The first and second heat exchangers are in closed loop fluid communication with each other and have a compressor (44) for circulating a refrigerant therethrough in selected directions.

47 Claims, 3 Drawing Sheets

HEAT PUMP SYSTEM AND METHOD FOR AIR-CONDITIONING

Matter enclosed in heavy brackets [ ] appears in the original patent but forms no part of this reissue specification; matter printed in italics indicates the additions made by reissue.

The present invention relates to heat pump systems and in particular to heat pump systems utilizing two subcycles, the first involving brine and the second a common refrigerant. The invention also relates to a method of air conditioning, utilizing the heat pump systems.

Space heating and cooling installations are known. Essentially, such installations comprise a closed top refrigerant circulated by means of a compressor through finned pipes located inside a house and outside thereof. In winter, the compressor forces compressed and warmed refrigerant into finned pipe sections within the house where condensation takes place. The liberated heat is usually dispensed into the house by means of a fan. The condensed refrigerant then passes through a throttle valve to an evaporator. The heat of evaporation is provided by the colder outside air. During summer, the sense of circulation of the refrigerant is reversed. The outside finned pipes constitute the condenser, while the inside finned pipes operate as the evaporator.

When such installations are used in areas where the climate is not mild, however, i.e., where the outside air temperature drops to close to the freezing mark or even therebelow, ice can accumulate on the surfaces of the outdoor evaporator and obstruct the air flow.

It is therefore a broad object of the present invention to ameliorate the above problem and to provide a heat pump system adapted to operate efficiently also in more severe climatic conditions.

It is a further object of the present invention to provide a heat pump system utilizing brine in heat exchange relationship with a refrigerant.

In accordance with the present invention there is therefore provided a heat pump system, comprising two, at least similar units in fluid communication with each other, each unit including a housing, a first air/brine heat exchanger, a second brine/refrigerant heat exchanger, brine inlet means for applying brine onto at least one of said heat exchangers, a brine reservoir and means for circulating said brine from the reservoir to said inlet means, said first and second heat exchangers being in closed loop fluid communication with each other and having compressor means for circulating a refrigerant therethrough in selected directions.

The invention further provides a method for air conditioning, comprising providing a housing, a first air/brine heat exchanger, a second brine/refrigerant heat exchanger, brine inlet means for applying brine onto at least one of said heat exchangers, a brine reservoir and means for circulating said brine from the reservoir to said inlet means, said first and second heat exchangers being in closed loop fluid communication with each other and having compressor means for circulating a refrigerant therethrough in selected directions, wherein the refrigerant's evaporator and the refrigerant's condenser exchange heat with brine solution, whereby the temperature of condensation of said refrigerant is reduced while the temperature of said evaporator is raised, thereby increasing the efficiency of the system.

Hygroscopic brine such as LiBr, $MgCl_2$, $Ca_2cl$ and mixtures thereof, can be advantageously used. The concentrations of these brines will be such that no precipitation of salts or ice throughout the working range of temperatures of the heat pump will be formed.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

IN THE DRAWINGS

Figure 1:
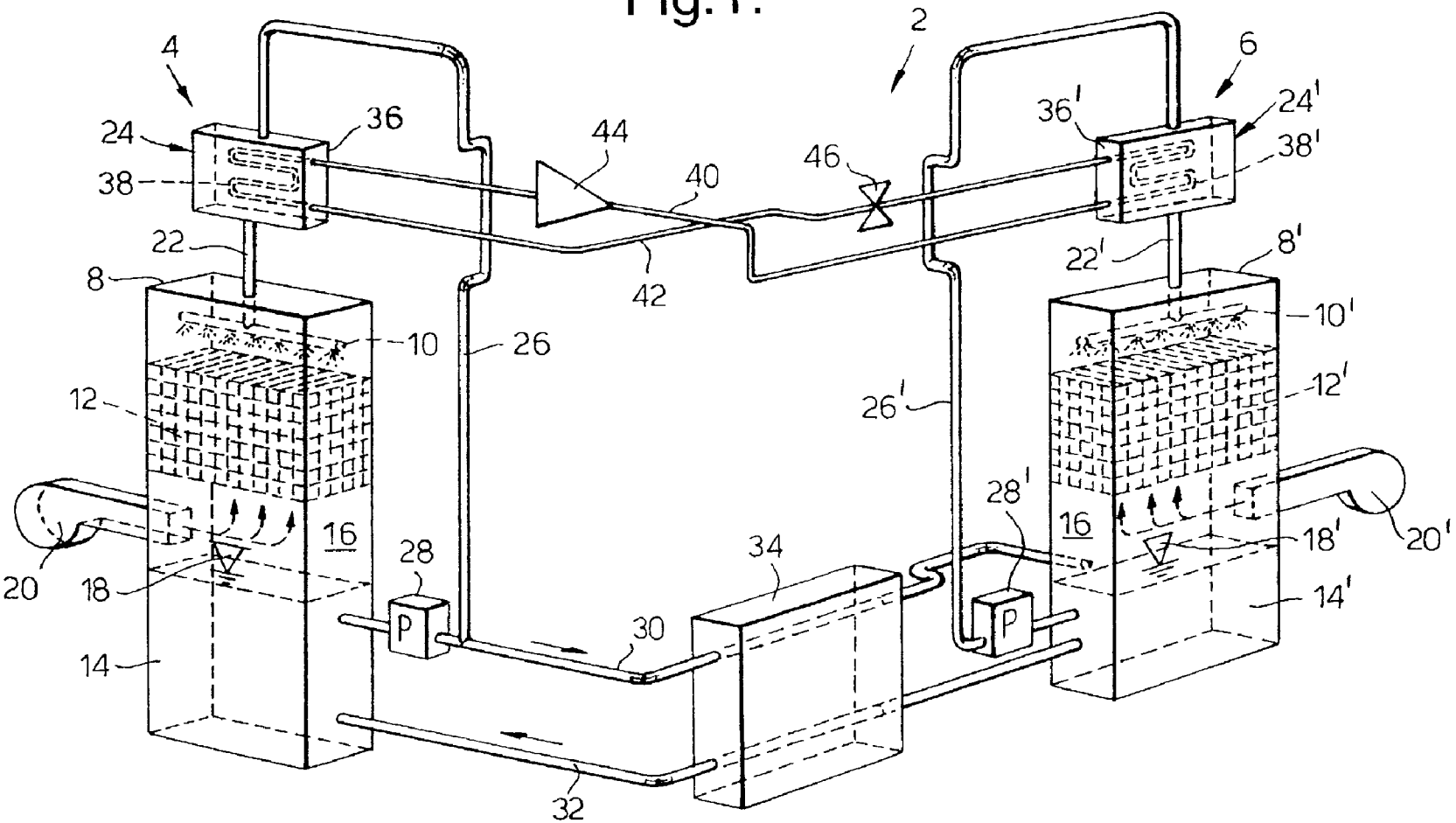
FIG. 1 is a schematic illustration of a heat pump system according to the present invention.

Seen in the Figure is a heat pump system 2 essentially comprising two substantially similar units 4 and 6, each acting in its turn as an evaporator and a condenser, one located inside an enclosure (not seen) to be air conditioned and the other, outside the enclosure exposed to ambient air. Each unit respectively includes a housing 8,8' and brine inlet means 10,10' disposed in the upper portion of the housing. The liquid inlet means is advantageously embodied by a set of drip or spray nozzles or apertures. Below the brine inlet means 10,10' there is affixed a brine/air heat exchanger 12,12'. The latter can be made of densely folded carton paper or of packed particles, e.g., glass or ceramic, pebbles of beads. The lower portion of the housing constitutes a brine reservoir 14,14' while the space 16,16' inside the housing delimited by the liquid level 18,18' and the heat exchanger 12,12', respectively, acts as a brine dripping space exposed to ambient air introduced thereinto, for example, by a blower 20,20' or by any other natural or forced means. Each of the brine inlet means 10,10' is respectively connected via conduit 22,22' to a second heat exchanger 24,24'. A conduit 26,26' leads from the heat exchanger 24,24' to the brine reservoir 14,14' via a circulation pump 28,28', respectively. The reservoirs 14,14' are in liquid communication via conduits 30 and 32 and advantageously, pass through a third heat exchange 34.

The heat exchangers 24,24', in their simple embodiment are composed of a closed vessel 36,36' each housing a coil 38,38', respectively. The coils 38,38' are interconnected, in a closed loop, by pipes 40,42. A compressor 44 fitted on the pipe 40 forces a refrigerant through the coils 38,38' via a throttle valve 46.

If not all, at least most, of the system's parts and components should be made of materials non-corrosive to brine.

In order to avoid the necessity of providing synchronization and control between the pumps 28,28', it is proposed to build the system such that the brine accumulated in the reservoir 14' will return to the reservoir 14 through conduit 32 as gravity flow. This is achieved by locating the reservoir 14' at a higher level than the level of reservoir 14 or at least inter-connecting the reservoir's conduit 32 in such orientation so as to slope from reservoir 14' to reservoir 14. In any case, the brine exchange flow rate between the reservoirs 14,14' via pipes 30,32 should be smaller than the circulation rate of the brine in the units 4 or 6 themselves. For operation under certain conditions, it is also possible to stop the circulation of the brine between the two units, if desired.

The size of the reservoirs will determine the capacity thereof acting as heat accumulators for eventual utilization.

Figure 2:
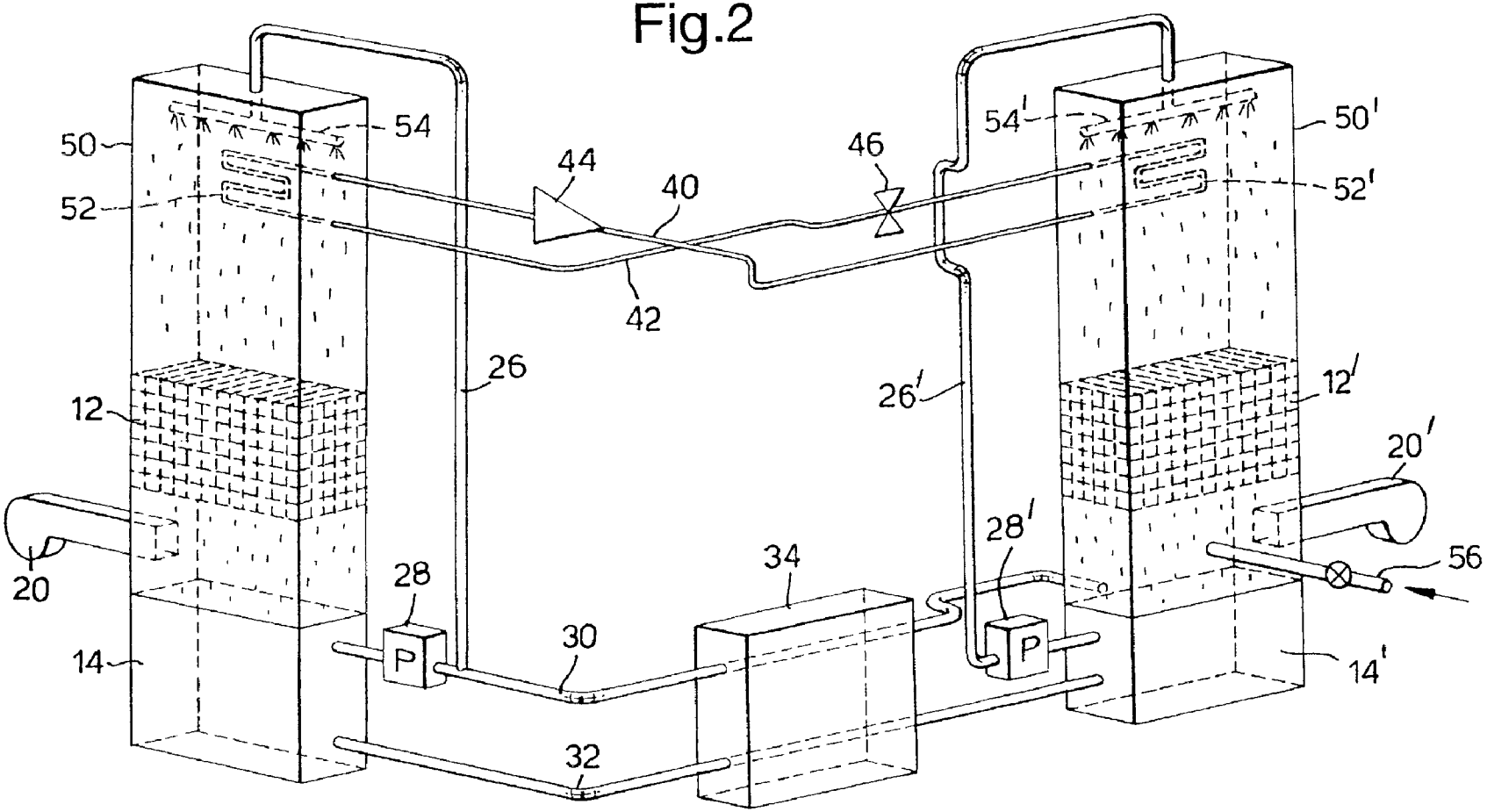
FIG. 2 is a schematic illustration of another embodiment of a heat pump according to the present invention.

Turning to FIG. 2, there is shown another embodiment of the invention in which the housing 50,50' also encloses the refrigerant coils 52,52' and the brine inlet means 54,54'. The latter are located above the coils 52,52', so as to drip or spray brine on the coils.

The embodiments of FIGS. 1 and 2 can be furnished with an inlet port 56 for introducing water to the brine reservoirs 14,14'. This will enable the dilution of the brine when operating the system in very dry and hot climate, to further increase the efficiency thereof.

Figure 3:
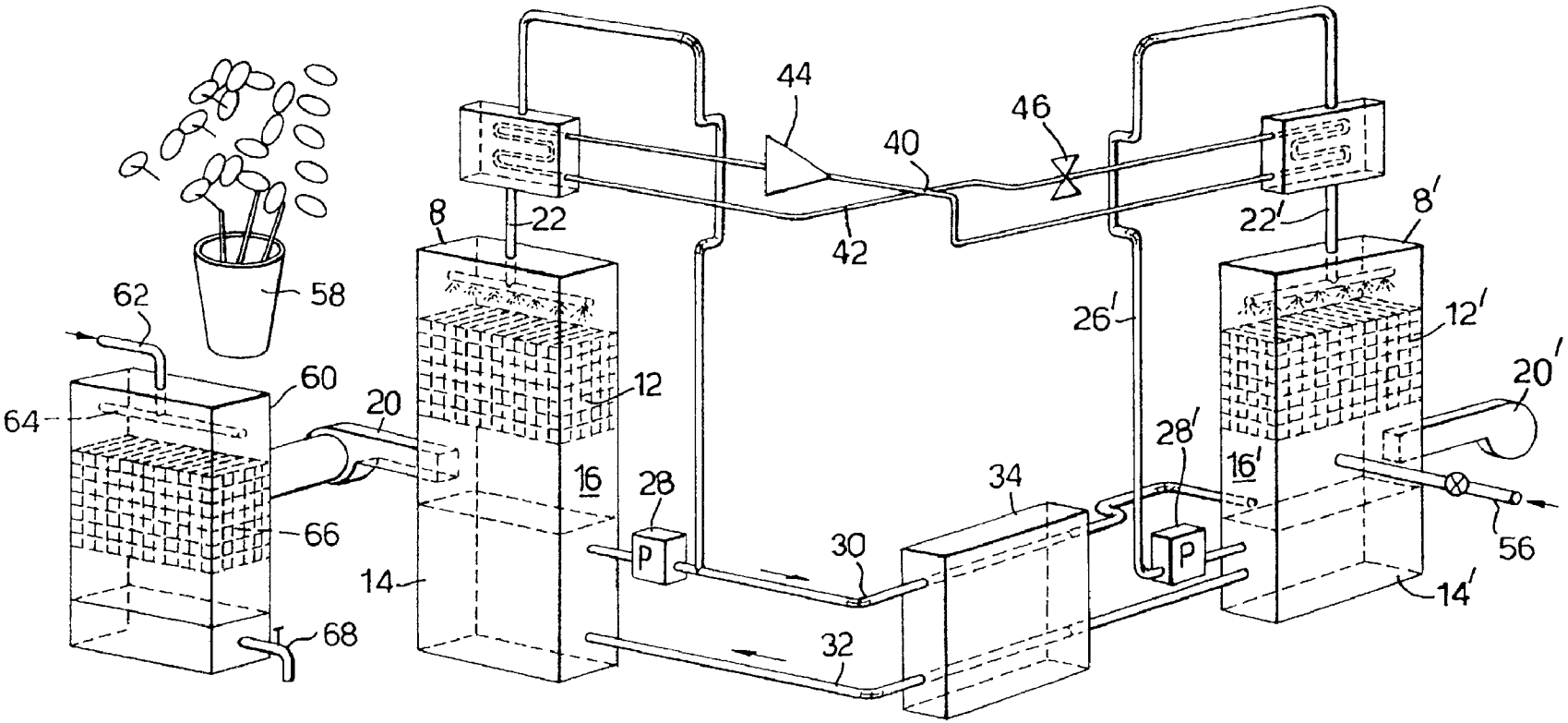
FIG. 3 is a modification of the heat pump of FIG. 1.

A modification of the system is illustrated in FIG. 3. Here, the system (of FIG. 1) is further provided with an external source of humidity in the form of plants 58, in order to increase the efficiency of the heat pump during the summer time. During the winter time, however, in order to increase the efficiency, it is recommended to elevate the temperature of the brine. This can be achieved by condensing the humidity of the brine by means of hot air blown by the blower 20. A source of such hot air can be provided in the form of a hot water to air heat exchanger 60, having a hot water inlet 62 leading to a drip or spray head 64, a heat exchange media 66 and a water outlet 68. The cold ambient air otherwise directly blown into the space 16 will thus be heated first and only thereafter introduced into the space 16.

As can now be readily understood, the outside or room air introduced by blowers 20,21' into the housings 8,8', flows as counter current or cross current to the droplets of brine dripping in the space 16,16', so as to exchange heat and vapor with the brine. Since the brine maintains the unit acting as an condenser at a temperature which is lower than the normal temperature, e.g., at 37° C. instead of 47° C., and parallely, maintains the evaporator's temperature higher than the normal temperature, e.g., 4° C. instead of 0° C., it can be shown that the efficiency of the cycle will be superior at a ratio, of about, e.g.:

$$\frac{47-0}{37-4} = 1.4.$$

Hence, the coefficient of performance of the brine heat pump, according to the present invention as compared with conventional heat pumps, is substantially higher. In other words, for the same input of energy, the brine heat pump will remove 40% more heat from an enclosure in which it is installed as compared with conventional heat pumps, provided that the mechanical efficiency of the two compressors is the same.

The average temperature head between the fluid inside and the brine in the above example is 6° C., and it is anticipated that for an area of 1 square meter of heat exchanger, the heat transfer rate will be about 6 Kw.

Therefore, the heat exchange area between the brine and the working fluid (in heat exchangers 24 and 24') will be small compared with the area required to transfer heat from the working fluid to the air in conventional heat pumps.

The small area of the heat exchanger is related to the large heat conductivity between the condenser and the evaporator's walls (h=1000 W/Square M.° C.) and the brine. The air conductivity is characterized by 70 watt units only (Watts/(square m C.).

The invention is also usable for refrigeration purposes.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A heat pump system comprising:

two, substantially similar units in fluid communication with each other, each unit including a housing, a forced-air counter-flow air/brine heat exchanger, a brine/refrigerant heat exchanger, brine inlet means for applying brine onto at least one of said heat exchangers, a brine reservoir and means for circulating said brine from the reservoir to said inlet means, said brine/refrigerant heat exchangers being in closed loop fluid communication with each other and having compressor means for circulating a refrigerant therethrough in a selected direction, and for reversing the sense of circulation of the refrigerant inside said closed loop.

2. A heat pump system, comprising:

two, substantially similar units in fluid communication with each other, each unit including a housing, brine inlet means at the top portion thereof, a first air/brine heat exchanger located adjacent said brine inlet means, a brine reservoir at the lower part of said housing and means for introducing forced air into brine-dripping space delimited between said first heat exchanger and said reservoir to produce a counter-flow air/brine heat exchanger, and a second heat exchanger in liquid communication with said brine inlet means and said reservoir;

the reservoir of each unit being in liquid communication with each other;

said second heat exchangers being in closed loop fluid communication with each other and having compressor means for circulating a refrigerant therethrough in a selected direction, and for reversing the sense of circulation of the refrigerant inside said closed loop, and means for circulating brine between said reservoir and said second heat exchanger of each unit.

3. The heat pump system as claimed in claim 1, wherein said brine inlet means are drip or spray nozzles.

4. The heat pump system as claimed in claim 2, wherein said means for introducing air is a blower.

5. The heat pump system as claimed in claim 1, wherein said housing is common to said first and second heat exchangers.

6. The heat pump system as claimed in claim 5, wherein said brine inlet means is located above said first and second heat exchangers.

7. The heat pump system as claimed in claim 2, wherein said first heat exchanger is an air/brine heat exchanger.

8. The heat pump system as claimed in claim 1, further comprising a third heat exchanger affixed on brine circulating pipes, interconnecting said reservoirs.

9. The heat pump system as claimed in claim 8, wherein at least said unit and said second and third heat exchangers are made of materials non-corrosive to brine.

10. The heat pump system as claimed in claim 1, further comprising a throttle valve affixed on a refrigerant carrying pipe interconnecting said second heat exchangers.

11. The heat pump system as claimed in claim 1, wherein at least one of said reservoirs is further provided with water inlet means for adding water to the brine.

12. A heat pump system, comprising:

two substantially similar or identical units in fluid communication with each other, each unit including a housing, an air/brine heat exchanger, a brine refrigerant heat exchanger, brine inlet means for applying brine into at least one of said heat exchangers, a brine reservoir and means for circulating said brine from the reservoir to said inlet means, said brine/refrigerant heat exchangers being in closed loop fluid communication with each other and having compressor means for circulating a refrigerant therethrough in a selected direction, and for reversing the sense of circulation of the refrigerant inside said close loop, and ambient air heating means for heating the ambient air prior to the introduction thereof into said housing.

13. The heat pump system as claimed in claim 12, wherein said heating means is a water/air heat exchanger.

14. A heat pump system, comprising:

two substantially similar or identical units in fluid communication with each other, each unit including a housing, an air/brine heat exchanger, a brine refrigerant heat exchanger, brine inlet means for applying brine into at least one of said heat exchangers, a brine reservoir and means for circulating said brine from the reservoir to said inlet means, said brine/refrigerant heat exchangers being in closed loop fluid communication with each other and having compressor means for circulating a refrigerant therethrough in a selected direction, and for reversing the sense of circulation of the refrigerant inside said closed loop, and an external humidity source for adding humidity to ambient air introducible into said housing.

15. The heat pump system as claimed in claim 14, wherein said humidity source is a plant.

16. A method of air conditioning, comprising:

providing a heat pump system as claimed in claim 1, wherein the refrigerant's evaporator and the refrigerant's condenser exchange heat with brine solution, whereby the temperature of condensation of said refrigerant is reduced while the temperature of said evaporator is raised, thereby increasing the efficiency of the system.

17. The method as claimed in claim 16, wherein said first heat exchanger is thermally associated with said refrigerant's evaporator.

18. The method as claimed in claim 16, wherein said first heat exchanger is thermally associated with said refrigerant's condenser.

19. A method for air conditioning, comprising:

providing a heat pump system having two substantially similar or identical units in fluid communication with each other, each unit including a housing, an air/brine heat exchanger, a brine refrigerant heat exchanger, brine inlet means for applying brine into at least one of said heat exchangers, a brine reservoir and means for circulating said brine from the reservoir to said inlet means, said brine/refrigerant heat exchangers being in closed loop fluid communication with each other and having compressor means for circulating a refrigerant therethrough in a selected direction, and for reversing the sense of circulation of the refrigerant inside said closed loop, wherein the refrigerant's evaporator and the refrigerant's condenser exchange heat with brine solution, whereby the temperature of condensation of said refrigerant is reduced while the temperature of said evaporator is raised, thereby increasing the efficiency of the system, and wherein said means for circulating the brine is adapted to circulate brine at a higher rate than the rate of circulation of the brine between said two reservoirs.

20. The heat pump as claimed in claim 1, further comprising means for circulating brine between said reservoirs.

21. A heat pump, comprising:

two substantially similar or identical units in fluid communication with each other, each unit including a housing, an air/brine heat exchanger, a brine refrigerant heat exchanger, brine inlet means for applying brine into at least one of said heat exchangers, a brine reservoir and means for circulating said brine from the reservoir to said inlet means;

said brine/refrigerant heat exchangers being in closed loop fluid communication with each other and having compressor means for circulating a refrigerant therethrough in a selected direction and for reversing the sense of circulation of the refrigerant inside said closed loop; and means for circulating brine between said reservoirs adapted to circulate brine at a lower rate than the rate of circulation of brine between the reservoirs and said inlet means.

22. The heat pump as claimed in claim 20, wherein said means for circulating brine between said reservoirs are adapted to circulate brine at a lower rate than the rate of circulation of brine between the reservoirs and the second heat exchanger of each unit.

23. A heat pump system, comprising:

two substantially similar units in fluid communication with each other, each unit including a housing, brine inlet means at the top portion thereof, a first heat exchanger located adjacent said brine inlet means, a brine reservoir at the lower part of said housing and means for introducing air into brine-dripping space delimited between said first heat exchanger and said reservoir, and a second heat exchanger in liquid communication with said brine inlet means and said reservoir;

the reservoirs of said units being in liquid communication with each other;

said second heat exchangers being in closed loop fluid communication with each other and having compressor means for circulating a refrigerant therethrough in a selected direction and for reversing the sense of circulation of the refrigerant inside said closed loop;

means for circulating brine between said reservoir and said second heat exchanger of each unit, and ambient air heating means for heating the ambient air prior to the introduction thereof into said housing.

24. The heat pump system as claimed in claim 23, wherein said heating means is a water/air heat exchanger.

25. A heat pump system, comprising:

two substantially similar units in fluid communication with each other, each unit including a housing, brine inlet means at the top portion thereof, a first heat exchanger located adjacent said brine inlet means, a brine reservoir at the lower part of said housing and means for introducing air into brine-dripping space delimited between said first heat exchanger and said reservoir, and a second heat exchanger in liquid communication with said brine inlet means and said reservoir;

the reservoirs of said units being in liquid communication with each other;

said second heat exchangers being in closed loop fluid communication with each other and having compressor means for circulating a refrigerant therethrough in a selected direction and for reversing the sense of circulation of the refrigerant inside said closed loop;

means for circulating brine between said reservoir and said second heat exchanger of each unit, and an external humidity source for adding humidity to ambient air introducible into said housing.

26. The heat pump system as claimed in claim 25, wherein said humidity source is a plant.

27. A method for air conditioning, comprising:

providing a heat pump system having two substantially similar units in fluid communication with each other, each unit including a housing, brine inlet means at the top portion thereof, a first heat exchanger located adjacent said brine inlet means, a brine reservoir at the lower part of said housing and means for introducing air into brine-dripping space delimited between said first heat exchanger and said reservoir, and a second heat exchanger in liquid communication with said brine inlet means and said reservoir;

the reservoirs of said units being in liquid communication with each other;

said second heat exchangers being in closed loop fluid communication with each other and having compressor means for circulating a refrigerant therethrough in a selected direction and for reversing the sense of circulation of the refrigerant inside said closed loop;

means for circulating brine between said reservoir and said second heat exchanger of each unit;

wherein the refrigerant's evaporator and the refrigerant's condenser exchanger heat with brine solution, whereby the temperature of condensation of said refrigerant is reduced while the temperature of said evaporator is raised, thereby increasing the efficiency of the system, and wherein said means for circulating the brine is adapted to circulate brine at a higher rate than the rate of circulation of the brine between said two reservoirs.

28. A heat pump system, comprising:

two substantially similar units in fluid communication with each other, each unit including a housing, brine inlet means at the top portion thereof, a first heat exchanger located adjacent said brine inlet means, a brine reservoir at the lower part of said housing and means for introducing air into brine-dripping space delimited between said first heat exchanger and said reservoir, and a second heat exchanger in liquid communication with said brine inlet means and said reservoir;

the reservoirs of said units being in liquid communication with each other;

said second heat exchangers being in closed loop fluid communication with each other and having compressor means for circulating a refrigerant therethrough in a selected direction and for reversing the sense of circulation of the refrigerant inside said closed loop, and means for circulating brine between said reservoir and said second heat exchanger of each unit, wherein said means for circulating brine are adapted to circulate brine at a lower rate than the rate of circulation of brine between the reservoirs and the second heat exchanger of each unit.

*29. A heat pump system, comprising:*

*two units in fluid communication with each other, each unit including:*

*a housing, an air/brine heat exchanger, a brine/refrigerant heat exchanger, brine inlet means for applying brine onto at least one of said heat exchangers, a brine reservoir and means for circulating said brine from the reservoir to said inlet means;*

*said brine/refrigerant heat exchangers of said units being in closed loop fluid communication with each other and having compressor means for circulating a refrigerant therethrough in selected directions, and*

*means for circulating brine between said reservoirs,*

*wherein said means for circulating the brine between said reservoirs are adapted to circulate brine at a lower rate than the rate of circulation of the brine between said reservoirs and said brine inlet means.*

*30. A heat pump system, comprising:*

*two units in fluid communication with each other, each unit including:*

*a housing, brine inlet means at the top portion thereof, a first heat exchanger located adjacent said brine inlet means, a brine reservoir at the lower part of said housing, and means for introducing air into brine-dripping space delimited between said first heat exchanger and said reservoir, and*

*a second heat exchanger in liquid communication with said brine inlet means and said reservoir;*

*said second heat exchangers being in closed loop fluid communication with each other and having compressor means for circulating a refrigerant therethrough in selected directions, and*

*means for circulating brine between said reservoir and said second heat exchanger of each unit,*

*and means for circulating brine between said reservoirs,*

*wherein said means for circulating the brine between said reservoirs are adapted to circulate brine at a lower rate than the rate of circulation of the brine between said reservoirs and said second heat exchanger of each unit.*

*31. The heat pump system as claimed in claim 29, wherein the reservoirs of each unit are in liquid communication with each other.*

*32. The heat pump system as claimed in claim 30, further comprising a third heat exchanger affixed on brine circulating pipes, interconnecting said reservoirs.*

*33. The heat pump system as claimed in claim 32, wherein at least said unit and said second and third heat exchangers are made of materials non-corrosive to brine.*

*34. The heat pump system as claimed in claim 30, further comprising a throttle valve affixed to a refrigerant-carrying pipe interconnecting said second heat exchangers.*

*35. The heat pump system as claimed in claim 29, wherein at least one of said reservoirs is further provided with water inlet means for adding water to the brine.*

*36. The heat pump system as claimed in claim 29, further comprising ambient air heating means for heating the ambient air prior to the introduction thereof into said housing.*

*37. The heat pump system as claimed in claim 36, wherein said heating means is a water/air heat exchanger.*

*38. The heat pump system as claimed in claim 29, further comprising an external humidity source for adding humidity to ambient air introducible into said housing.*

*39. The heat pump system as claimed in claim 38, wherein said humidity source is a plant.*

*40. A method for air conditioning, comprising:*

*providing a heat pump system as claimed in claim 29 and further including a refrigerant evaporator and a refrigerant condenser, wherein the refrigerant evaporator and the refrigerant condenser exchange heat with brine solution, whereby the temperature of condensation of said refrigerant is reduced while the temperature of said evaporator is raised, thereby increasing the efficiency of the system.*

*41. The method as claimed in claim 40, wherein said air/brine heat exchanger is thermally associated with said refrigerant evaporator.*

*42. The method as claimed in claim 40, wherein said air/brine heat exchanger is thermally associated with said refrigerant condenser.*

*43. A dehumidifier system comprising:*

*a dehumidifying chamber into which moist air is introduced and from which less moist air is removed after dehumidification;*

*a desiccant solution situated in two reservoirs;*

*a first conduit via which desiccant solution is transferred from a first reservoir of said two reservoirs to the dehumidifying chamber, said solution being returned to said first reservoir after absorbing moisture from the moist air;*

*a regenerator which receives desiccant solution from a second reservoir of said two reservoirs and removes moisture from it;*

*a second conduit via which desiccant is transferred from said second reservoir to the regenerator, said solution being returned to said second reservoir after moisture is removed from it;*

*a heat pump that transfers heat from the solution in the first conduit to the solution in the second conduit, and*

*means for circulating desiccant solution between said reservoirs,*

*wherein said means for circulating the desiccant between said reservoirs are adapted to circulate desiccant at a lower rate than the rate of transfer of said desiccant from said reservoirs to at least one of said dehumidifying chamber and said regenerator.*

*44. A dehumidifier system comprising:*

*a dehumidifying chamber into which moist air is introduced and from which less moist air is removed after dehumidification;*

*a desiccant solution situated in a first reservoir;*

*a first conduit via which desiccant solution is transferred from the first reservoir to the dehumidifying chamber, said solution being returned to said first reservoir after absorbing moisture from the moist air;*

*a desiccant solution situated in a second reservoir;*

*a regenerator which receives desiccant solution from the second reservoir and removes moisture from it;*

*a second conduit via which desiccant is transferred from the second reservoir to the regenerator, said solution being returned to said second reservoir after moisture is removed from it; and*

*means for circulating desiccant solution between said reservoirs,*

*wherein a substantial temperature differential is maintained between the first and second reservoirs, and*

*wherein said means for circulating the desiccant between said reservoirs are adapted to circulate desiccant at a lower rate than the rate of circulation of the desiccant between said reservoirs and at least one of said dehumidifying chamber and said regenerator.*

*45. A method for air conditioning, comprising:*

*providing a heat pump system as claimed in claim 30 and further including a refrigerant evaporator and a refrigerant condenser, wherein the refrigerant evaporator and the refrigerant condenser exchange heat with brine solution, whereby the temperature of condensation of said refrigerant is reduced while the temperature of said evaporator is raised, thereby increasing the efficiency of the system.*

*46. The method as claimed in claim 45, wherein said first heat exchanger is thermally associated with said refrigerant evaporator.*

*47. The method as claimed in claim 45, wherein said first heat exchanger is thermally associated with said refrigerant condenser.*

* * * * *